United States Patent [19]
Morgan

[11] 4,074,534
[45] Feb. 21, 1978

[54] THERMODYNAMIC MOTOR

[76] Inventor: Wesley W. Morgan, 208 Dandelion, San Antonio, Tex. 78213

[21] Appl. No.: 765,269

[22] Filed: Feb. 3, 1977

[51] Int. Cl.$^2$ ............................................... F01K 7/00
[52] U.S. Cl. ........................................ 60/675; 60/531
[58] Field of Search .................. 60/641, 530, 531, 675

[56] References Cited

U.S. PATENT DOCUMENTS

| | | | |
|---|---|---|---|
| 243,909 | 7/1881 | Iske | 60/675 |
| 2,513,692 | 7/1950 | Tubbs | 60/531 |
| 3,509,716 | 5/1970 | Avery | 60/675 X |
| 3,659,416 | 5/1972 | Brown | 60/530 |
| 3,984,985 | 10/1976 | Lapeyre | 60/641 |

*Primary Examiner*—Allen M. Ostrager
*Attorney, Agent, or Firm*—John C. Stahl

[57] ABSTRACT

A thermodynamic motor comprising a plurality of diagonally opposing pairs of tanks mounted on a rotatable frame, a diaphragm separating each tank into inner and outer chambers, the inner chambers of opposing pairs of tanks interconnected by a conduit, a fluid carried in said inner chambers and conduit, at least one radiator communicating with the outer chamber of each tank, a volatile liquid substantially filling each radiator, the radiator of the lower tank of each pair at least partially immersed in a heated liquid whereby upon volatization of said volatile liquid the vapor pressure distends the diaphragm, forces the fluid from the inner chamber of the lower tank and a corresponding volume to the inner chamber of the opposing tank creating an unbalanced condition which causes rotation of said motor.

9 Claims, 12 Drawing Figures

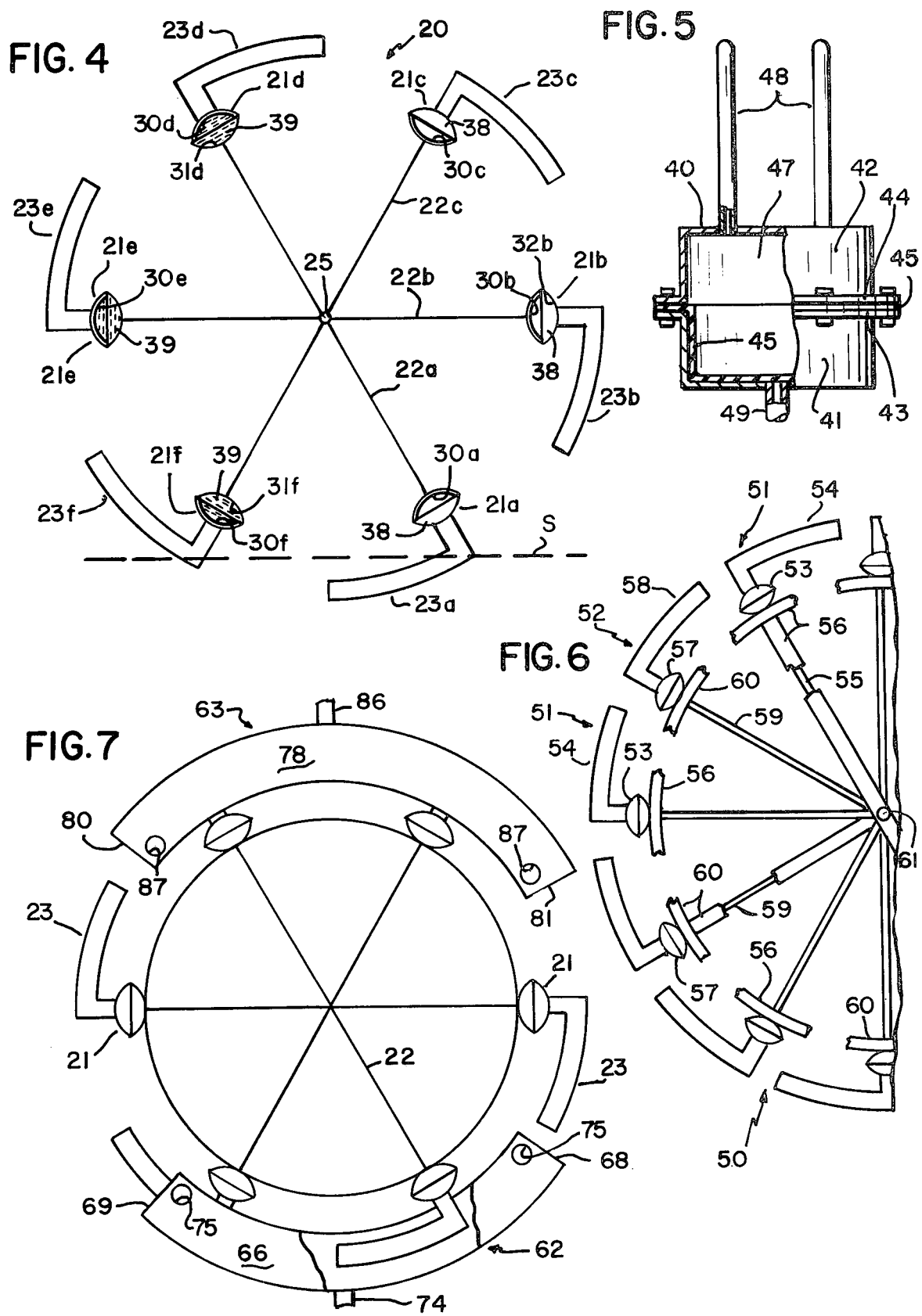

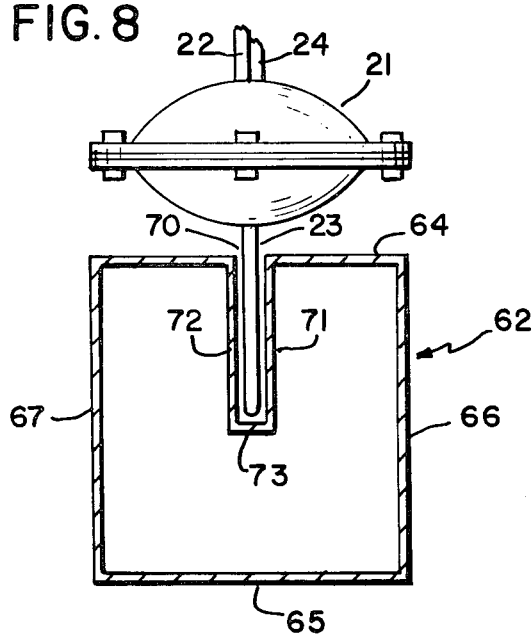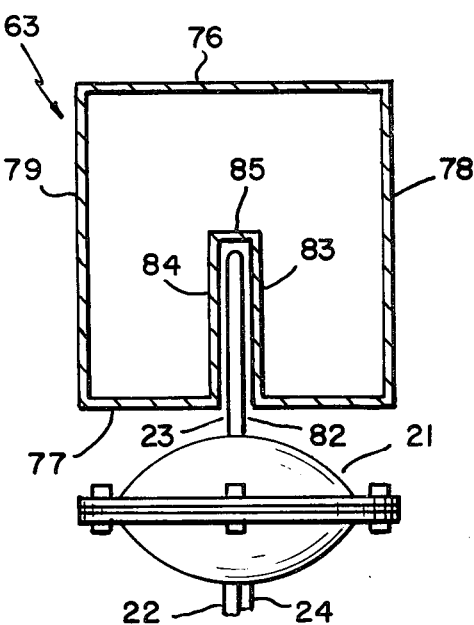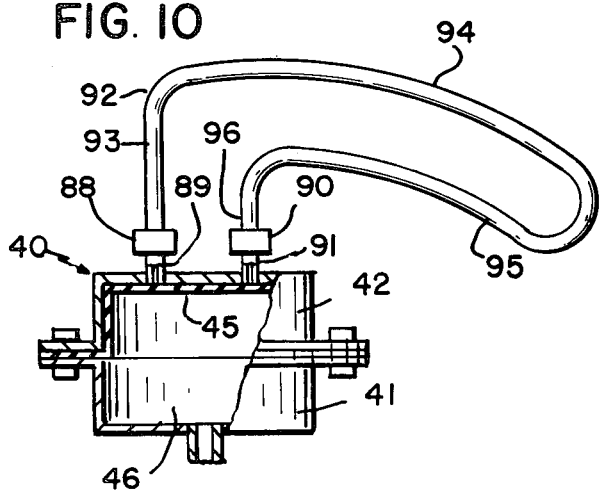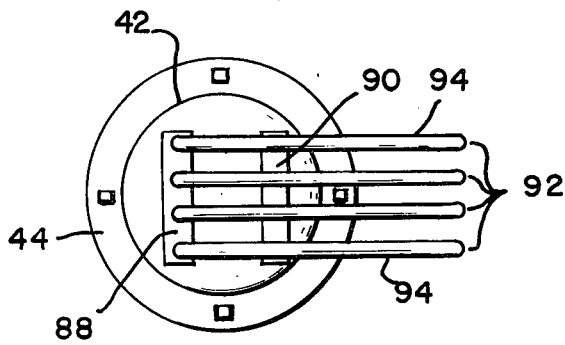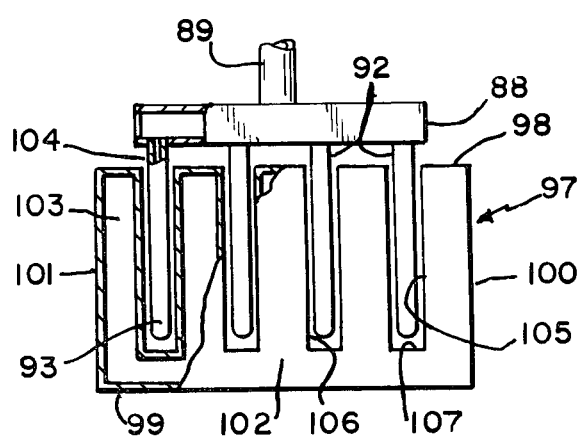

THERMODYNAMIC MOTOR

BACKGROUND OF THE INVENTION

Many attempts have been made to utilize solar heated pools of water and other sources of heated liquids to drive mechanical apparatus. In general, thermodynamic motors of such type have not proven entirely satisfactory and are characterized by low power output and irregular rates of rotation.

U.S. Pat. No. 3,509,716 teaches a thermodynamic motor which is adapted to use solar energy. Diagonally opposite pairs of tanks are interconnected by conduits to effect transfer of volatile liquid from the lower tank to the upper tank as a result of the heat energy supplied to the lower tanks by the pool water. The transfer of the volatile liquid effects rotation of the motor.

The invention of U.S. Pat. No. 3,974,653 relates to thermodynamic motors and to the conversion of a heat differential, produced by the evaporation of water or by the natural differential in the atmosphere, into usable energy and in particular to the generation of electricity.

SUMMARY OF THE INVENTION

The principal object of the subject invention is the provision of a thermodynamic motor which utilizes any available source of heated liquid to provide rotational movement.

Another object is to provide such a motor which is partially immersed in said source of heated liquid, creating an unbalanced condition which causes rotation of said motor.

A further object is to provide such a thermodynamic motor which is relatively inexpensive to manufacture, requires little or no maintenance over extended periods of operation, and is universal in its adaptability.

Other objects and features of the invention will become apparent to those skilled in the art from a consideration of the following specification when read in the light of the annexed drawings.

BRIEF DESCRIPTION OF THE DRAWINGS

FIG. 4 is a diagrammatic view showing the position of the diaphragm in each tank in the several positions of the thermodynamic motor.

FIG. 5 is a front elevational view, partly broken away and partly in section, showing another embodiment of tank and associated radiator.

FIG. 6 is a fragmentary, side elevational view, partly broken away, showing a thermodynamic motor including at least first and second interconnected power sources.

FIG. 7 is a diagrammatic view showing heating and cooling chambers mounted circumferentially about a thermodynamic motor.

FIG. 8 is a greatly enlarged vertical sectional view, transverse to the longitudinal axis of the heating chamber of FIG. 7.

FIG. 9 is a greatly enlarged vertical sectional view, transverse to the longitudinal axis of the cooling chamber of FIG. 7.

FIG. 10 is a side elevational view, partly broken away and partly in section, of another embodiment of tank and associated radiator.

FIG. 11 is a top plan view of the embodiment of FIG. 10.

FIG. 12 is a greatly enlarged front elevational view, partly broken away and partly in section, showing the tanks of FIGS. 10 and 11 rotatably mounted within a heating chamber of the subject invention.

DESCRIPTION OF PREFERRED EMBODIMENTS

Figure 1:
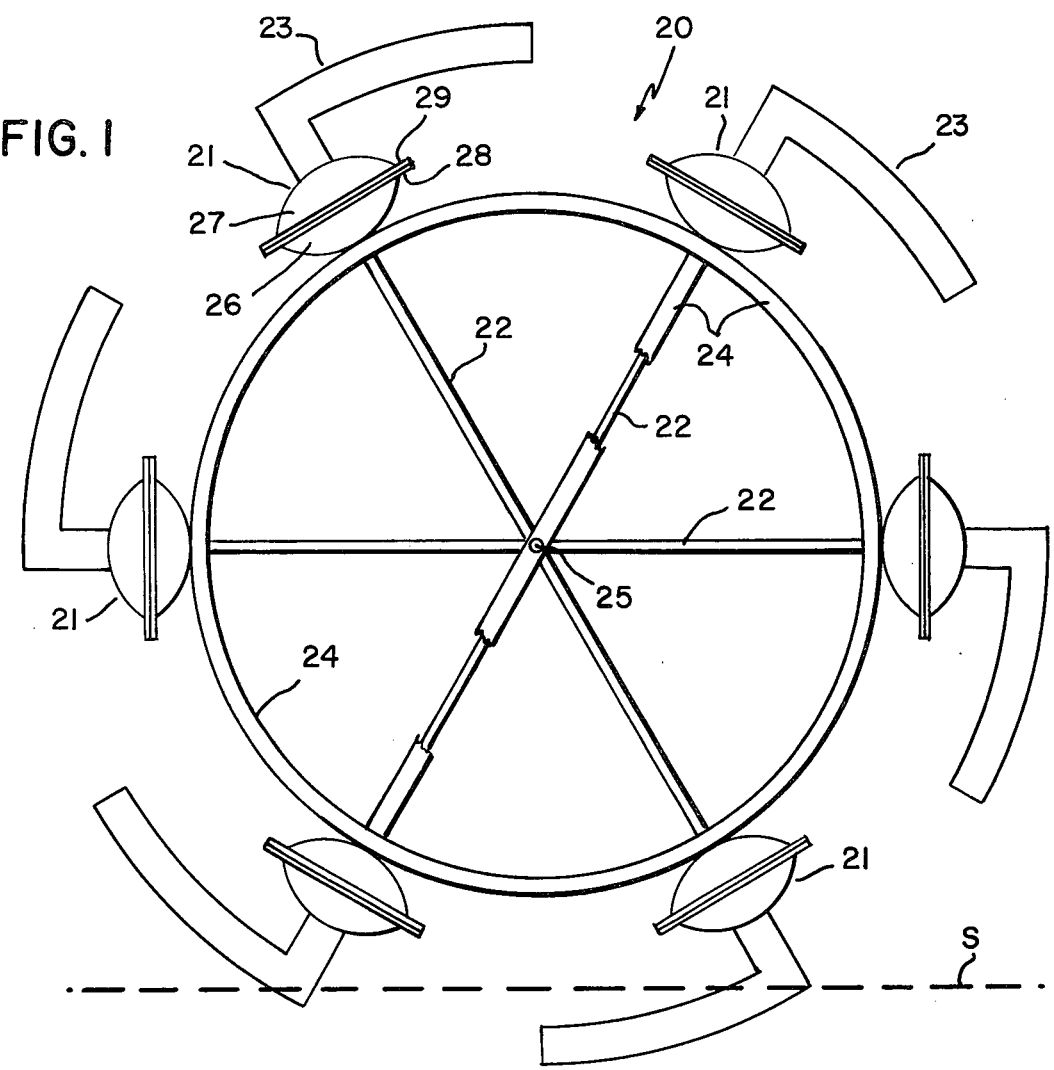
FIG. 1 is a side elevational view, partly broken away, of a thermodynamic motor of the subject invention at least partially immersed in a source of heated liquid.

Referring now to the drawings, wherein like reference characters designate like or corresponding parts throughout the several views, there is shown in FIG. 1 a thermodynamic motor 20 of the subject invention. In general, motor 20 consists of a plurality of circumferentially spaced tanks 21, a conduit 22 of desired inside diameter and length interconnecting selected portions of diagonally opposing pairs of tanks, and a heat exchanger or radiator 23 of desired configuration and length connected to selected portions of said tanks. Framework 24 of conventional construction connects to said tanks and/or conduits with associated axle 25 adapted to be mounted in bearings or the like for rotary movement and a power take-off for the motor.

Figure 2:
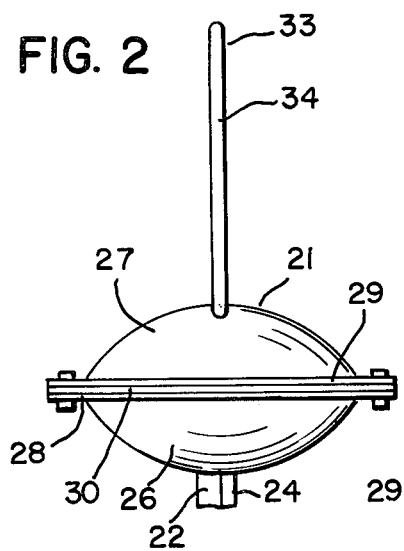
FIG. 2 is a greatly enlarged, front elevational view of one embodiment of tank and associated radiator.
Figure 3:
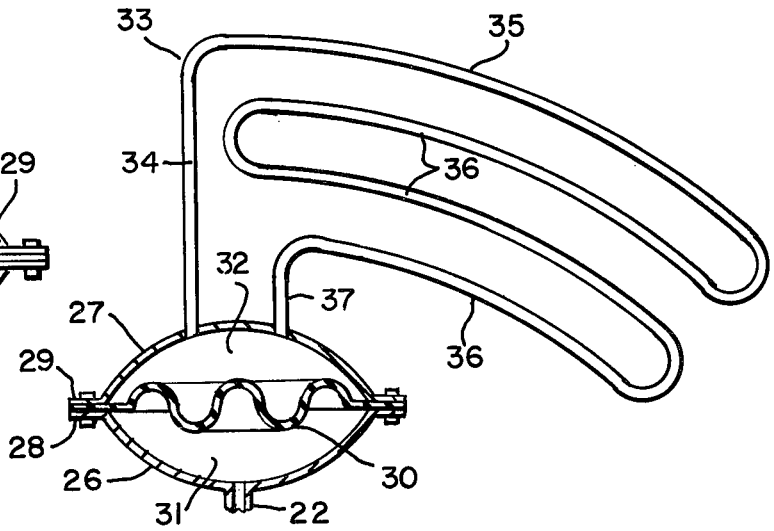
FIG. 3 is a greatly enlarged, vertical sectional view of the embodiment of FIG. 2, showing a corrugated diaphragm in said tank in unflexed condition.

As best seen in FIGS. 2 and 3 of the drawings, each tank 21 consists of coacting, hollow shaped members 26–27 which terminate medially and peripherally in flanges 28–29, respectively. It is understood that tanks of hollow, essentially hemispheroidal, spherical and cylindrical shape may be used; in a specific embodiment of the invention, however, each of the plurality of tanks should be of similar shape and size. Flexible diaphragm 30 is conventionally secured intermediate flanges 28, 29 thereby forming inner and outer chambers 31–32, respectively, of desired volume within each tank; flat, cupped or corrugated diaphragms of impervious composition such as neoprene, butyl-n or the like, adapted to at least partially conform to the inner surfaces of the opposing members 26, 27 in the fully flexed conditions of each diaphragm, may be utilized.

A preferred embodiment of radiator comprises shaped tubular member 33 which is generally flat and lies in a vertical plane paralleling the longitudinal axis of the motor. Member 33 terminates at one end in depending leg 34 of desired length which is secured to the approximate center of member 27 and communicates with outer chamber 32; outwardly disposed arcuate section 35, having a curvature approximately corresponding to an arc scribed about axle 25, extends to a point approximately medially between a selected tank and the adjacent tank reckoned in a counterclockwise direction; any desired number of inwardly disposed arcuate sections 36, each of which generally parallel section 35, are approximately equally spaced relative to each other; and depending leg 37 connects to a selected portion of member 27 and communicates with said outer chamber.

A volatile liquid 38, having a substantial pressure differential relative to a small temperature difference, such as methylene chloride, dichloro-tetrafluoro-ethane, dichloro-difluoro-methane, monochloro-difluoro-methane, butane, propane, and other fluorocarbons and hydrocarbons normally used as refrigerants, is adapted to be carried in each radiator in sufficient volume to approximately fill the same in a liquid state. Fluid 39, ranging in density from 1–13.55, preferably mercury, is carried in each conduit and the two interconnected inner chambers in such volume to fill said conduit and at least one of said tanks with the corresponding diaphragm fully distended by said fluid.

Motor 20 thus formed is mounted vertically above a source S of heated liquid, such as provided by a solar heated pool or the like, in such a manner that upon rotation of said motor the radiator of the lower tank of each pair of tanks is at least partially immersed in said heated liquid; to minimize drag, the outer member of each tank preferably does not extend into said liquid. Upon volatization of the liquid in the radiator and outer chamber of the lower tank of each pair by the elevated temperature of source S, a vapor pressure is created which when applied to the respective diaphragm distends the same, driving fluid 39 from the corresponding inner chamber to the inner chamber of the opposing tank.

As shown diagrammatically in FIG. 3, at such time that radiator 23a of tank 21a is still immersed in the heated liquid S, volatization of fluid 38 commences and diaphragm 30a partially distends, forcing fluid 39 through conduit 22a into inner chamber 31d of tank 21d; diaphragm 30d correspondingly distends to accommodate such additional fluid. Prior to reaching the position of tank 21b, fluid 38 is fully volatized in radiator 23b and the vapor pressure in outer chamber 32b fully distends diaphragm 30b forcing fluid in the inner chamber of said tank therefrom and a corresponding volume into tank 21e. In the position of tank 21c, fluid 38 is condensing in radiator 23c due to the evaporative cooling of said radiator, a jet of cool air directed thereagainst or other cooling means hereinafter to be more fully described; diaphragm 30c is fully distended under reduced vapor pressure since inner chamber 31f of tank 21f is filled with fluid 39 by gravitational force and there is no opposition to such distention. Radiator 23f of tank 21f enters the heated liquid while radiator 23a of tank 21a is still at least partially immersed therein whereby such cycle is continuous. It is evident that the greater volume of fluid in the inner chamber of each tank to the left of a vertical plane extending through axle 25 relative to the interconnected tank on the opposite side of said vertical plane creates an unbalanced condition whereby motor 20 rotates in a counterclockwise direction.

There is shown in FIG. 5 of the drawings another embodiment of tank 40 of the subject invention consisting of coacting, hollow, essentially cylindrically shaped members 41–42 which terminate medially and peripherally in flanges 43–44; diaphragm 45 of cup shape or the like is conventionally secured intermediate said flanges forming inner chamber 46 (see FIG. 10) and outer chamber 47 of desired volumes within each tank. A plurality of vertically and longitudinally extending, laterally spaced radiators 48 of desired shape, including but not limited to the embodiment of FIG. 3, are secured to member 42 and communicate with outer chamber 47. Conduit 49 is secured to member 41 and communicates with inner chamber 46.

Thermodynamic motor 50 of FIG. 6 comprises two or more longitudinally extending and laterally spaced and interconnected power sources 51–52 each of which are substantially similar to the embodiment of FIG. 1 of the drawings. More specifically, power sorce 51 consists of a plurality of circumferentially spaced tanks 53, associated radiators 54, conduits 55 interconnecting diagonally opposing pairs of said tanks, and framework 56 secured to said tanks and/or conduits. In like manner, power source 52 consists of a plurality of circumferentially spaced tanks 57, associated radiators 58, conduits 59 interconnecting opposing pairs of said tanks, and framework 60 secured to said tanks and/or conduits. Tanks 57 are positioned intermediate tanks 53; radiators 54, 58 of desired length each extend to a point at least partially beyond the midpoint between a selected tank of one power source and the next tank of the other power source as reckoned in a counterclockwise direction. Axle 61 is secured to selected portions of frameworks 56, 60 for rotary movement of the motor 50 thus formed.

It is understood that thermodynamic motors 20, 50 heretofore described in detail may be used in combination with a closed, arcuate shaped and circumferentially disposed heating chamber 62 positioned essentially therebelow (see FIG. 7) and/or arcuate shaped, circumferentially disposed cooling chamber 63 positioned essentially thereabove, said chambers lying in the longitudinal plane of said motor and adapted to receive each radiator 23 for heat transfer in accordance with the principles of the invention. Heating chamber 62 of desired length may extend from approximately 80°–270° measured from the vertical in a clockwise direction; cooling chamber 63 of desired length may extend from approximately 250° measured from the vertical in a clockwise direction to approximately 90° from such reference plane in a clockwise direction, the ends of said cooling chamber may approximately abut the corresponding portions of said heating chamber when said chambers are essentially circumferentially around said motor.

As shown in FIG. 8, heating chamber 62 includes top 64, bottom 65, sides 66–67, ends 68–69 with an upwardly opening and longitudinally extending slot 70 in said top which comprises sides 71–72 and bottom 73; said slot opens in ends 68, 69 and is of sufficient width and depth to receive radiator 23 in a relatively close fit. Tubes 74–75 are connected to selected parts of said chamber through which heated water, steam or other heated liquid may be introduced and exhausted. It is understood that electrical heating elements may be conventionally secured to the innermost surfaces of sides 71, 72 to provide radiant or convective heating within said slot.

Cooling chamber 63 (see FIG. 9) includes top 76, bottom 77, sides 78–79, ends 80–81, and longitudinally extending and downwardly opening slot 82 in the bottom comprising opposing sides 83–84 and top 85; slot 82 opens in ends 80, 81 and is of sufficient width and height to accomodate radiators 23 in a relatively close fit. Tubes 86–87 are provided for introducing and exhausting a liquid at approximately ambient temperature to said chamber.

In each of the embodiments of the invention utilizing heating chamber 62 independently or in combination with cooling chamber 63, fins or the like are provided on selected portions of each radiator for more efficient heat transfer with lots 70, 82 of sufficient width in the respective chambers to accommodate the same.

There is shown in FIGS. 10–11 essentially cylindrical tank 40 heretofore described in detail; transversely extending front manifold 88, of lesser width than member 42, is secured thereto by means of tube 89 and communicates with outer chamber 47 (see FIG. 5). Rear manifold 90, paralleling manifold 88 and spaced a desired distance therefrom in a counterclockwise direction, communicates with chamber 47 by means of tube 91. Any desired number of vertically and longitudinally extending, laterally spaced radiators 92 terminate respectively at one end in depending leg 93 which is secured to and communicates with manifold 88; arcuate section 94, having a curvature approximately corresponding to an arc scribed about the axle of said motor, extends to a point approximately medially between a selected tank and the adjacent tank reckoned in a counterclockwise direction; at least one inwardly disposed arcuate section 95 generally parallels section 94; and depending leg 96 is secured to and communicates with rear manifold 90. When using such embodiment of tank, radiators 92 are immersed in the source of heated liquid; preferably manifolds 88, 90 do not extend downwardly into said liquid.

Closed, arcuate shaped heating chamber 97, constructed in accordance with the principles of heating chamber 62 of FIGS. 7 and 8, is adapted to receive radiators 93 of FIGS. 10 and 11 of the drawings. More specifically, chamber 97 (see FIG. 12) includes top 98, bottom 99, side 100-101, ends 102-103 and a plurality of longitudinally extending and upwardly opening slots 104 in said top; each slot comprises sides 105-106 and bottom 107 which is of sufficient width and depth to accommodate a selected radiator in a relatively close fit. Heated water, steam or the like may be applied to said chamber. A cooling chamber including a plurality of downwardly opening slots, constructed substantially in accordance with the principles of FIGS. 7, 9 and 12, may be used in combination with a pool of heated liquid as taught in FIG. 1 or heating chamber 97 heretofore described.

In the practice of the invention, the number of tanks, configuration of each such tank, the type and flexibility of each diaphragm, the volumes of the inner and outer chambers, the length and capacity of each radiator, the volatile liquid carried in each radiator and outer chamber, and the fluid carried in the interconnected inner chambers may be varied to provide a thermodynamic motor of desired power and direction of rotation. With further reference to the length of the radiators in the several embodiments of the invention, in general, in a motor utilizing a relatively small number of widely separated tanks, the radiator associated with a selected tank is generally still immersed in the heated liquid when the radiator of the succeeding tank is beginning to enter such liquid. On the other hand, in those embodiments utilizing a relatively large number of closely spaced tanks, alternate tanks are positioned laterally of the longitudinal axis of the motor and a radiator associated with a selected tank at least partially overlies the succeeding tank.

It should be understood, of course, that the foregoing disclosure relates to only preferred embodiments of the invention and that numerous modifications or alterations may be made therein without departing from the spirit and scope of the invention as set forth in the appended claims.

What is claimed is:

1. A thermodynamic motor adapted to be at least partially immersed in a heated liquid comprising a frame, an axle mounted for rotation of said frame, a plurality of diagonally disposed pairs of tanks mounted in spaced relationship on said frame, a flexible diaphragm in each tank forming inner and outer chambers, a conduit interconnecting the inner chambers of each pair of tanks, at least one radiator communicating with the outer chamber of each tank, a volatile liquid substantially filling at least said radiator of each tank, and a fluid carried in said inner chambers of each pair of tanks whereby the radiator of the lower tank of each pair at the bottom of its travel is at least partially immersed in said heated liquid and upon volatization of said volatile liquid the vapor pressure distends said diaphragm, forces the fluid from the inner chamber of said tank and a corresponding volume into the inner chamber of the opposing tank and shifts the center of gravity of each of said pairs of tanks about said axle to cause rotation of said motor.

2. The invention of claim 1 wherein said volatile liquid is selected from the group consisting of fluorocarbons and hydrocarbons.

3. The invention of claim 1 wherein said fluid ranges in density from 1-13.55.

4. The invention of claim 1 wherein a selected radiator is at least partially immersed in said heated liquid when the radiator of the adjacent tank as reckoned in the direction of rotation is beginning to enter said liquid.

5. The invention of claim 1 wherein said heated liquid is a solar heated pool of water.

6. The invention of claim 1 further including a cooling chamber at least partially disposed above said motor and adapted to receive each radiator upon rotation of said motor.

7. A thermodynamic motor comprising a frame, an axle mounted for rotation of said frame, a plurality of diagonally disposed pairs of tanks mounted in spaced relationship on said frame, a flexible diaphragm in each tank forming inner and outer chambers, a conduit interconnecting the inner chambers of each pair of tanks, at least one radiator communicating with the outer chamber of each tank, a volatile liquid substantially filling at least said radiator of each tank, a fluid carried in said inner chambers of each pair of tanks, and a heating chamber positioned at least partially below said motor whereby the radiator on the lower tank of each pair at the bottom of its travel at least partially inserts into said heating chamber and upon volatization of said volatile liquid the vapor pressure distends said diaphragm, forces the fluid from the inner chamber of said tank and a corresponding volume into the inner chamber of the opposing tank, and shifts the center of gravity of each of said pairs of tanks about said axle to cause rotation of said motor.

8. The invention of claim 7 further including a cooling chamber at least partially disposed above said motor and adapted to receive each radiator upon rotation of said motor.

9. The invention of claim 7 wherein fins are provided on selected portions of each radiator.

* * * * *